(12) United States Patent
Elsässer et al.

(10) Patent No.: US 8,844,284 B2
(45) Date of Patent: Sep. 30, 2014

(54) INTERNAL COMBUSTION ENGINE SYSTEM

(75) Inventors: Alfred Elsässer, Keltern (DE); Patric Genieser, Stuttgart (DE); Achim Gommel, Simmozheim (DE); Mike Lau, Stuttgart (DE); Boris Lerch, Stuttgart (DE); Adam Loch, Stuttgart (DE); Kristijan Mudroh, Stuttgart (DE)

(73) Assignee: Mahle International GmbH (DE)

( * ) Notice: Subject to any disclaimer, the term of this patent is extended or adjusted under 35 U.S.C. 154(b) by 1004 days.

(21) Appl. No.: 12/523,260

(22) PCT Filed: Dec. 28, 2007

(86) PCT No.: PCT/EP2007/064601
§ 371 (c)(1),
(2), (4) Date: Jan. 27, 2010

(87) PCT Pub. No.: WO2008/086939
PCT Pub. Date: Jul. 24, 2008

(65) Prior Publication Data
US 2010/0132357 A1     Jun. 3, 2010

(30) Foreign Application Priority Data
Jan. 16, 2007   (DE) .................. 10 2007 003 116

(51) Int. Cl.
F02B 33/44    (2006.01)
F02M 25/07    (2006.01)
F02D 9/04     (2006.01)
F02B 37/02    (2006.01)
F01N 13/02    (2010.01)
F02B 29/04    (2006.01)

(52) U.S. Cl.
CPC ....... *F02M 25/0713* (2013.01); *F02M 25/0746* (2013.01); *F02M 25/071* (2013.01); *F02D 9/04* (2013.01); *F01N 2240/36* (2013.01); *Y02T 10/144* (2013.01); *F02M 25/0709* (2013.01); *F02M 25/0718* (2013.01); *F02B 37/02* (2013.01); *Y02T 10/121* (2013.01); *F01N 13/02* (2013.01); *F02M 25/0707* (2013.01); *F02M 25/0731* (2013.01); *F02B 29/0437* (2013.01); *F01N 2240/26* (2013.01)
USPC .......... 60/605.2; 60/324; 60/278; 123/568.11

(58) Field of Classification Search
USPC .............................. 60/605.2, 324; 123/568.11
See application file for complete search history.

(56) References Cited

U.S. PATENT DOCUMENTS 4,345,571 A * 8/1982 Iizuka et al. ............. 123/568.27
4,735,178 A * 4/1988 Inoue et al. ................... 180/219

(Continued)

FOREIGN PATENT DOCUMENTS

DE      4414849      11/1995
DE      10040613     3/2001

(Continued)

OTHER PUBLICATIONS

English abstract for JP-0413867.

(Continued)

*Primary Examiner* — Thomas Denion
*Assistant Examiner* — Patrick Maines
(74) *Attorney, Agent, or Firm* — Rader, Fishman & Grauer PLLC

(57) ABSTRACT

The invention relates to an internal combustion engine system (1), particularly in a motor vehicle, comprising an internal combustion engine (2), a fresh gas system (3) for supplying fresh gas to the internal combustion engine (2), an exhaust gas system (4) for discharging exhaust gas from the internal combustion engine (2), and an exhaust gas recirculation system (5) for removing exhaust gas from the exhaust gas system (4)

Figure 1:
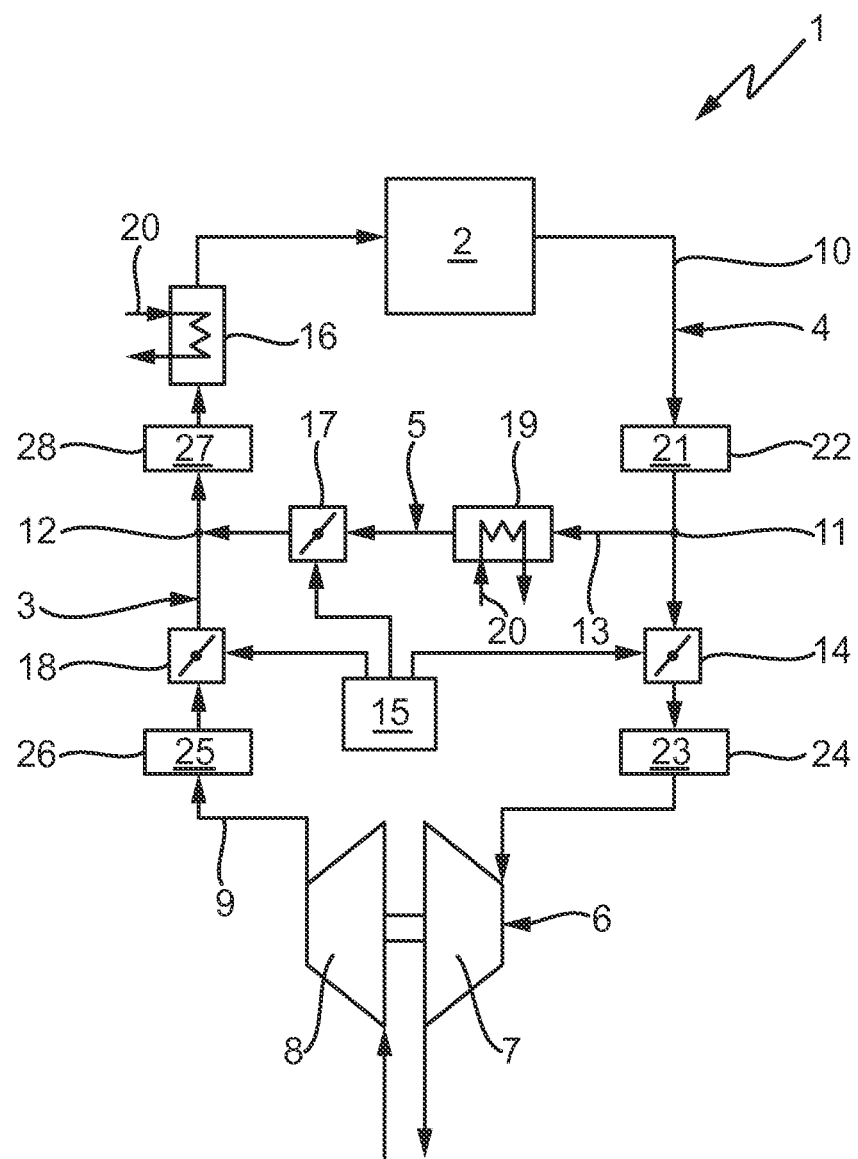

at a removal point (11) and introducing the removed exhaust gas into the fresh gas system (3) at an introduction point (12). In order to improve exhaust gas recirculation, the exhaust gas system (4) is equipped with an exhaust gas valve (14) downstream of the removal point (11) in order to control the penetrable cross-section of the exhaust gas system (4).

8 Claims, 3 Drawing Sheets

(56) References Cited

U.S. PATENT DOCUMENTS

| | | | |
|---|---|---|---|
| 5,142,866 A * | 9/1992 | Yanagihara et al. | 60/605.2 |
| 5,426,936 A * | 6/1995 | Levendis et al. | 60/278 |
| 5,669,365 A * | 9/1997 | Gartner et al. | 123/568.12 |
| 5,927,256 A * | 7/1999 | Morita et al. | 123/568.25 |
| 6,354,084 B1 * | 3/2002 | McKinley et al. | 60/605.2 |
| 6,422,216 B1 * | 7/2002 | Lyko et al. | 123/568.11 |
| 6,945,235 B1 | 9/2005 | Bertilsson et al. | |
| 7,043,914 B2 * | 5/2006 | Ishikawa | 60/605.2 |
| 7,937,213 B2 * | 5/2011 | Buis et al. | 701/114 |
| 7,958,728 B2 * | 6/2011 | Dumas et al. | 60/605.1 |
| 2001/0017033 A1 | 8/2001 | McKinley et al. | |
| 2004/0093866 A1 * | 5/2004 | Ishikawa | 60/605.2 |
| 2005/0257520 A1 * | 11/2005 | Fischle et al. | 60/600 |
| 2006/0096805 A1 * | 5/2006 | Staut | 181/271 |
| 2007/0089412 A1 * | 4/2007 | Sommerhoff | 60/599 |
| 2007/0157809 A1 * | 7/2007 | Ehlers | 95/280 |
| 2007/0214771 A1 | 9/2007 | Freitag et al. | |
| 2008/0190108 A1 | 8/2008 | Eitel et al. | |
| 2008/0286127 A1 * | 11/2008 | Gaude et al. | 417/312 |
| 2009/0038308 A1 * | 2/2009 | Nagae | 60/602 |
| 2009/0194079 A1 * | 8/2009 | Nagae et al. | 123/568.11 |
| 2011/0131979 A1 * | 6/2011 | Ryan et al. | 60/605.2 |
| 2012/0012086 A1 * | 1/2012 | Yoeda et al. | 123/559.1 |

FOREIGN PATENT DOCUMENTS

| | | |
|---|---|---|
| DE | 102004044893 | 9/2004 |
| DE | 10327603 | 1/2005 |
| DE | 102005008103 | 2/2005 |
| DE | 102005026926 | 1/2006 |
| DE | 102005002266 | 7/2006 |
| EP | 0531277 | 3/1993 |
| EP | 1455078 | 9/2004 |
| EP | 1712760 | 10/2006 |
| JP | 04103867 | 4/1992 |
| JP | 2000-170551 A | 6/2000 |
| JP | 2001-90616 | 4/2001 |
| JP | 2004-027956 A | 1/2004 |
| JP | 2005-337011 A | 12/2005 |
| JP | 2006-233898 A | 9/2006 |
| JP | 2006-336547 A | 12/2006 |
| WO | WO-2006/004469 | 1/2006 |

OTHER PUBLICATIONS

English abstract for EP-1455078.
English abstract for EP-0531277.
English abstract for DE-4414849.
English abstract for DE-10327603.
English abstract for DE-102005026926.
English abstract for DE-102005002266.
JP Office Action for JP-2009545847.

* cited by examiner

INTERNAL COMBUSTION ENGINE SYSTEM

CROSS-REFERENCES TO RELATED APPLICATION

This application is a National Stage application which claims the benefit of International Application No. PCT/EP2007/064601 filed Dec. 28, 2007, which claims priority based on German Patent Application No. 102007003116.7, filed Jan. 16, 2007, both of which are hereby incorporated by reference in their entirety.

The present invention relates to an internal combustion engine system, in particular in a motor vehicle.

Conventionally, an internal combustion engine system comprises an internal combustion engine, such as a diesel-operated engine or a petrol-operated engine, a fresh-gas system for supplying fresh gas to the internal combustion engine, an exhaust-gas system for conducting exhaust gas away from the internal combustion engine, as well as an exhaust gas recirculation system for removing exhaust gas from the exhaust gas system at a removal point and for introducing the removed exhaust gas into the exhaust gas system at an introduction point. The exhaust gas recirculation is conducted in order to reduce both the values of pollutant emissions and fuel consumption of the internal combustion engine.

To achieve exhaust gas recirculation, a drop of pressure is necessary between the removal point and the introduction point. In particular, the provision of a sufficient drop of pressure can be problematic in a charged internal combustion engine.

The present invention addresses the problem of providing for an internal combustion engine system of the above-mentioned type an improved embodiment that is characterised by improved exhaust gas recirculation.

This problem is solved according to the invention by the subject matter of the independent claim. Advantageous embodiments are the subject matter of the dependent claims.

The invention is based on the general idea of arranging in the exhaust gas system downstream from the removal point an exhaust gas valve that is designed in such a manner that a cross-section of the exhaust gas system that is flowed through can be controlled. With corresponding control of the exhaust gas valve, this design makes it possible to generate a targeted increase in pressure in the exhaust gas upstream from said exhaust gas valve. This activity can increase the drop in pressure between the removal point and the introduction point, which improves recirculation of exhaust gas.

According to an advantageous development, the exhaust gas valve can be designed in such a manner that it is dynamically controllable. A dynamically controllable or controlled exhaust gas valve is present if, for example, by means of a corresponding valve control, the switching state of the exhaust gas valve is set or can be set as a function of operational states of the internal combustion engine. For example, the exhaust gas valve can be dynamically operated as a function of the load and/or engine speed of the internal combustion engine in order to dynamically adjust the exhaust gas pressure on the RS to the changing requirement for recirculating exhaust gas that changes depending on the operational state of the internal combustion engine.

Moreover, the exhaust gas valve can be designed as a fast-switching valve. A fast-switching valve is a valve that can be adjusted between two extreme control positions within a comparatively brief amount of time. For example, such a fast-switching valve can be adjusted between a control position with a maximally opened cross section that can be flowed through and a control position with a minimally opened or with a closed cross section with switching times of less than 50 ms or less than 20 ms or less than 10 ms or less than 5 ms. Such fast-switching valves are basically known as air impulse valves that can be used for such purposes in fresh-gas systems by effecting an impulse charge of the internal combustion engine by using flow-dynamic effects.

In an additional advantageous embodiment, in order to achieve a predetermined exhaust-gas recirculation rate, it can be provided for that the exhaust gas valve is designed in such a manner that in order to generate impulse-like pressure impulses, it is designed or controllable with predetermined frequency in the exhaust gas recirculation system. By generating pressure impulses, comparatively high amplitudes can be generated in the pressure curve of the recirculated exhaust gas. A comparatively large pressure drop prevails in the range of these pressure amplitudes between removal point and introduction point, which promotes exhaust gas recirculation. Impulse-like pressure impulses can be achieved in particular by rapid opening and closing of the cross-section, which can be flowed through, of the exhaust gas system since short-time changes in the cross-section cause flow-dynamic effects to arise that lead to the desired impulse formation.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

Preferred embodiments of the invention are shown in the drawings and are described in more detail in the following description, the same reference numerals referring to components which are the same or functionally the same or similar.

Figure 2:
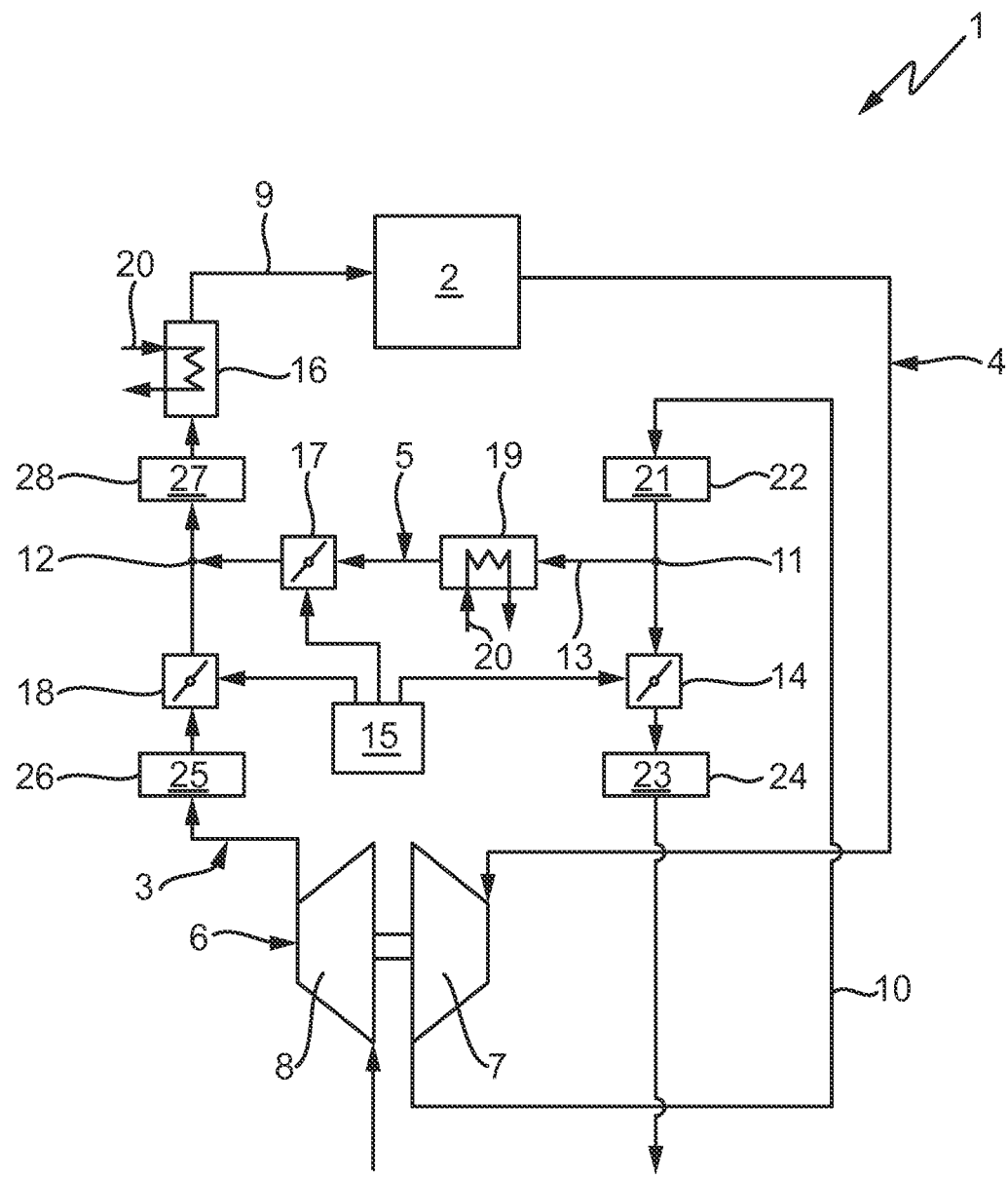
Figure 3:
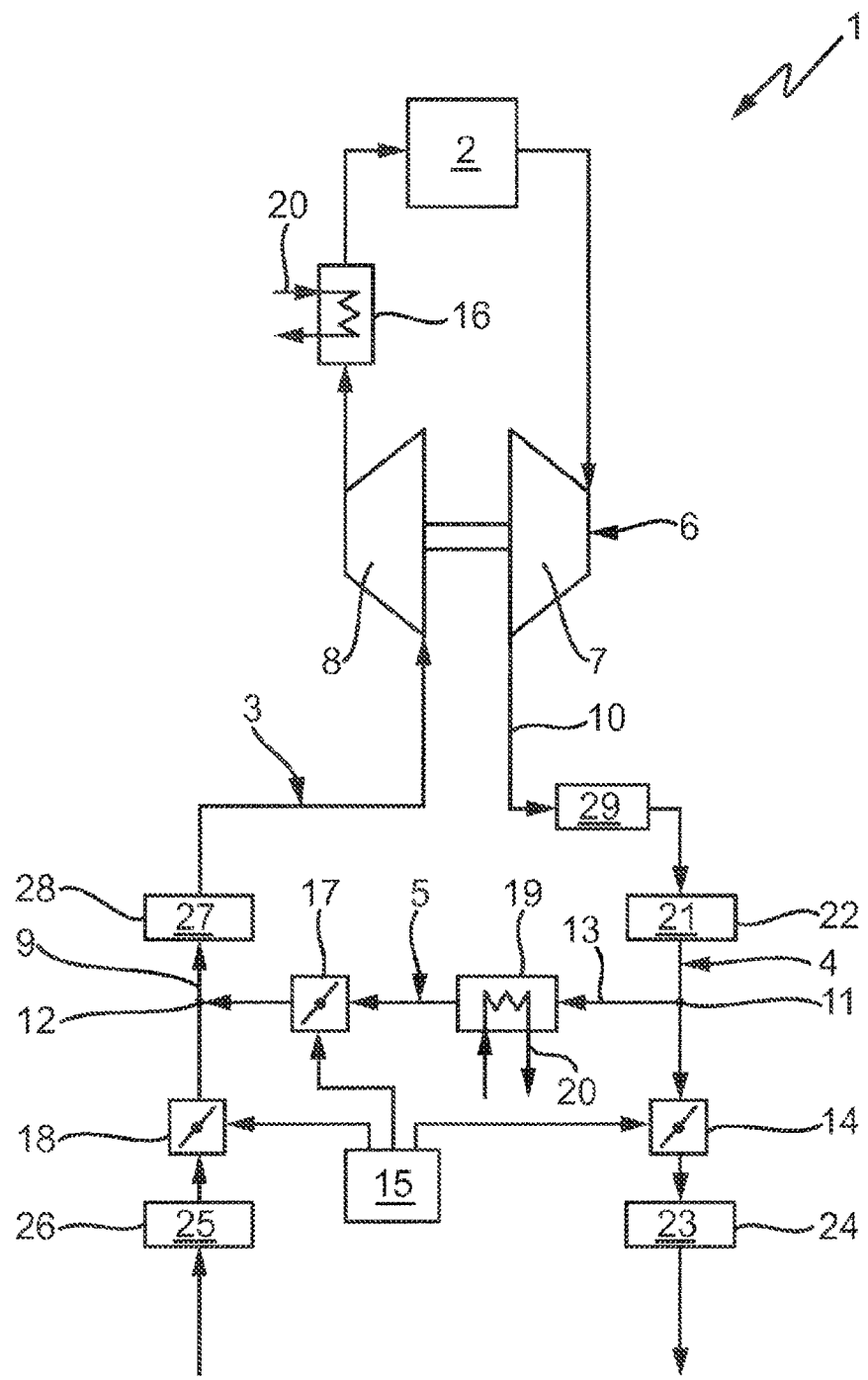

The figures show in schematic diagrams,

FIGS. 1 to 3 each a greatly simplified, circuit-diagram-like schematic diagram of different embodiments of an internal combustion engine system.

Corresponding to FIGS. 1 to 3, an internal combustion engine system 1, that can be arranged in particular in a motor vehicle, comprises an internal combustion engine 2, a fresh-gas system 3, an exhaust-gas system 4, as well as an exhaust gas recirculation system 5. The internal combustion engine can be a diesel-operated engine or a petrol-operated engine or the like. The internal combustion engine 2 can be designed as a pure induction engine or, as in this case, as a charged motor. In the charged variant shown, the internal combustion engine 1 is additionally equipped with, for example, an exhaust turbocharger 6 the turbine 7 of which is arranged in the exhaust gas system 4 and its compressor 8 in the fresh-gas system 3.

The fresh-gas system 3 serves to supply fresh gas, air in particular, to the internal combustion engine 2. For this purpose, the fresh-gas system 3 has a fresh-gas line 9 that is connected to the internal combustion engine 2 and, in the present case, is arranged in the compressor 8.

The exhaust-gas system 4 serves to conduct exhaust gas away from the internal combustion engine 2. For this purpose, the exhaust-gas system 4 comprises an exhaust-gas line 10 that is connected to the internal combustion engine 2 and, in the present case, contains the turbine 7.

The exhaust-gas recirculation system 5 is designed to remove exhaust gas from the exhaust gas system 4 at a removal point 11 and to introduce this removed exhaust gas at an introduction point 12 into the fresh-gas system 3.

For this purpose, the exhaust-gas system 5 has an exhaust-gas line 13 that on the one hand is connected to the exhaust-gas line 10 by means of the removal point 11 and, on the other hand, is connected to the fresh-gas line 9 by means of the introduction point 12.

In order to improve the recirculation of exhaust gas, an exhaust gas valve 14 is provided that is arranged in the exhaust gas system 4 or in the exhaust gas line 10 downstream from the removal point 11. The exhaust gas valve 14 is designed in such a manner that a cross-section, which can be flowed through, of the exhaust gas system 4 or of the exhaust gas line 10 can be controlled therewith. By reducing the cross-section, which can be flowed through, of the exhaust gas system 4, the pressure in the exhaust gas can be increased upstream of the exhaust gas valve 14, which increases the pressure difference between the removal point 11 and the introduction point 12. This pressure difference propels the exhaust gas to be recirculated in the direction of the fresh-gas system 3. The targeted generation of ram pressure by means of the exhaust gas valve 14 upstream therefrom makes it possible for the recirculated exhaust gas amount to be increased, which improves the exhaust gas recirculation overall.

An embodiment that is particularly advantageous is one in which the exhaust gas valve 14 is designed to be dynamically controllable. Such a design makes it possible, in particular, to operate the exhaust gas valve 14 as a function of the dynamically changing operational state of the internal combustion engine 2 in order to adjust, by dynamically controlling the exhaust gas pressure at the removal point 11, the exhaust gas recirculation rate or the exhaust gas recirculation amount to the dynamically changing requirement. In particular, the exhaust gas valve 14 can thereby be dynamically operated as a function of the engine speed and/or the load of the internal combustion engine 2. A valve control 15 is provided to operate or control the exhaust gas valve 14, which valve control is connected to the exhaust gas valve 14 in a suitable manner and is furthermore connected to an engine management system or is integrated therein, for example.

The exhaust gas valve 14 can preferably be designed as a fast-switching valve that realises within relatively short switching times or control times the desired changes of the cross-section, which is flowed through, of the exhaust gas system 4. For example, the exhaust gas valve 14 can be shifted in a millisecond range between a closed position or a position with a cross-section that can be flowed through only minimally, and an open position or a position with a cross-section that is maximally open. More particularly, the fast-switching exhaust gas valve 14 can be switched in the same frequency range in which the charge-changing processes of the internal combustion engine 2 occur. In this manner, a synchronisation of the exhaust gas valve 14 is adjustable to pressure fluctuations in the exhaust gas, which fluctuations arise in any case owing to the charge-changing processes in the exhaust gas system 4. For example, pressure amplitudes in the pulsatory exhaust gas flow can be increased in a targeted manner.

The exhaust gas valve 14 can be designed as a discontinuously operating valve in which a valve member, such as a butterfly valve, with opposing directions of movement can be switched between at least two predetermined control positions. Without limiting generality, such a discontinuously operating exhaust gas valve 14 can have a flap, for example, as a valve member, that is axially rotatable about an axis of rotation and that can be switched between a closed position and an open position. In this manner, the valve member rotates upon closing in the one direction of rotation and rotates upon opening in the other direction of rotation. Furthermore, a characterising feature of a discontinuously operating valve is that the respective valve member remains for a certain period of time in the respectively set control position in such a manner that the valve member is in motion only during the temporally limited and rapidly occurring switching processes.

Alternatively, the exhaust gas valve 14 could also be a continuously operating valve, the valve member of which runs through at least two different control positions with the same direction of movement. Without limiting generality, such a continuously operating exhaust gas valve 14 can have a flap or a rotary valve, for example, as a valve member, that can be rotatably driven about an axis of rotation. A characterising feature of a continuously operating exhaust gas valve 14 is that during operation of the valve, the respective valve member rotates constantly in the same direction of rotation and thus, with a predetermined rotational speed, passes through a closing angle range and an opening angle range, for example. By means of such a continuously operating exhaust gas valve 14, extremely short switching times can be achieved, it being possible, however, that a change in the cross-section occurs constantly and the respective valve member is constantly in motion. By varying the rotational speed, the switching times can be set in such a continuously operating exhaust gas valve 14.

Corresponding to a particularly advantageous embodiment, it can be provided to control the corresponding exhaust gas valve 14 in such a manner that impulse-like pressure impulses can be generated in the exhaust gas recirculation system 5 with a predetermined frequency. These pressure impulses can be designed in a targeted fashion such that a predetermined exhaust gas recirculation rate can be realised therewith. For example, by means of an exhaust gas valve 14, with which comparably short switching times can be achieved, that is to say in particular with a fast-switching exhaust gas valve 14, flow-dynamic effects can be used to generate such pressure impulses. Furthermore, the pressure fluctuations that are already present in the exhaust gas flow anyway and result from the charge-changing process, can be increased by a correspondingly adapted and synchronised control of the exhaust gas valve 14 in order to generate the desired pressure impulses.

In so far as the internal combustion engine system 1, as here, is equipped with an exhaust gas turbocharger, a fresh-gas cooler 16 can additionally be arranged in the fresh-gas system 3, which fresh-gas cooler is generally designated a charge air cooler. The fresh-gas cooler 16 is located downstream from the compressor 8 in the fresh-gas line 9. The introduction point 12 is advantageously arranged upstream from the fresh-gas cooler 16. The recirculated exhaust gas can additionally be cooled in this manner. Moreover, the blending of fresh gas and recirculated exhaust gas can also be thereby improved in that the blend must flow through the fresh-gas cooler 16.

In the embodiment shown here, a recirculation valve 17 is provided that optionally can be arranged in the exhaust gas recirculation system 5 or in the exhaust gas recirculation line 13 in order to control the cross-section, which can be flowed through, of the exhaust gas recirculation system 5 upstream from the introduction point 12. In a simple case, this recirculation valve 17 can be a reverse blocking valve that prevents fresh gas from faultily flowing through the exhaust gas recirculation system 5 into the exhaust gas system 4. Such a reverse blocking valve can operate passively. In a special embodiment, the recirculation valve 17 can be controlled, for example, by the valve control 15. The controllable recirculation valve 17 can particularly be used to increase the pressure impulses generated by the exhaust gas valve 14 or to generate such impulses should the exhaust gas valve 14 not be controlled to generate pressure impulses. The controllable recirculation valve 17 can likewise be controlled so that fresh gas is prevented from faultily flowing through the exhaust gas recirculation system 5 into the exhaust gas system 4. Furthermore, it is possible in particular to operate the controllable, that is to say active, recirculation valve 17 for controlling the pressure impulses generated by means of the exhaust gas valve 14 in order to entirely or only partially permit passage of the pressure impulses, for example. In contrast to a passively operating reverse blocking valve, the controllable recirculation valve 17 can control a considerably greater cross-section that can be flowed through, thereby correspondingly reducing the flow resistance.

Additionally or alternatively, a fresh-gas valve 18 can be arranged in the fresh-gas system 3. This fresh-gas valve is arranged in the fresh-gas line 9 upstream from the introduction point 12 and can advantageously be designed in such a manner that the cross-section, which can be flowed through, of the fresh-gas system 3 can be controlled. By means of such a fresh-gas valve 18, the pressure in the fresh gas downstream from the fresh-gas valve 18 can be reduced by reducing the cross-section that can be flowed through, which increases the pressure difference between removal point 11 and introduction point 12. Furthermore, it is generally possible by means of such a fresh-gas valve 18 to increase, in a targeted manner, pressure fluctuations in the fresh gas, which fluctuations are already present anyway owing to the charge-changing process in the fresh-gas system 3, in order to improve the recirculation of exhaust gas. The fresh-gas valve 18 is also advantageously operable by means of the valve control 15.

In order to be able to control or operate the recirculation valve 17 or the fresh-gas valve 18 with the above-described modes of operation for the realisation with a corresponding high dynamic, the recirculation valve 17 and/or the fresh-gas valve 18 can be designed as dynamically controllable and/or can be switched as a fast-switching valve. Moreover, the recirculation valve 17 and/or the fresh-gas valve 18 can be designed as a discontinuously operating valve or as a continuously operating valve.

The exhaust gas recirculation system 5 can conventionally contain an exhaust gas recirculation cooler 19 that is arranged in the exhaust gas recirculation line upstream from the recirculation valve 17. Just as with the fresh-gas cooler 16, the exhaust gas recirculation cooler 19 can likewise be incorporated in a cooling circuit 20, which generally is a cooling circuit of the internal combustion engine 2.

In the exhaust gas system 4, it is possible for a damping volume to be arranged upstream from the removal point 11. For example, in this instance, the exhaust gas line 10 contains a damping volume 22 that is designed upstream from the introduction point 11. Additionally or alternatively, the exhaust gas system 4 can have a damping volume 23 downstream from the exhaust gas valve 14. This can, for example, be designed in a damping chamber 24, for example, that is arranged in the exhaust gas line 10 downstream from the exhaust gas valve 14. Additionally or alternatively, a damping volume 25 can be arranged in the fresh-gas system 3 upstream from the fresh-gas valve 18 or upstream from the introduction point 12, for example. This can, for example, be arranged in a damping chamber 26, for example, that is designed in the fresh-gas line 9 upstream from the introduction point 12 or upstream from the fresh-gas valve 18. Additionally or alternatively, a damping volume 27 can be arranged in the fresh-gas system 3 downstream from the introduction point 12. This damping volume 27 can, for example, be arranged in a damping chamber 28 that is designed in the fresh-gas line 9 downstream from the introduction point 12. The damping volumes 21, 23, 25, 27 are measured in such a manner that they largely decouple the dynamic pressure changes in the exhaust gas recirculation system 5 from the exhaust gas system 4 and/or from the fresh-gas system 3, which pressure changes are generated by means of the switching processes of the exhaust gas valve 14 and, in so far as extant, of the recirculation valve 17 or of the fresh-gas valve 18. For example, pressure impulses that are generated in the exhaust gas recirculation system 5 can be damped in the respective damping chamber 22, 24, 26, 28 in such a manner that these pressure impulses do not reach the internal combustion engine 2 or do not reach the exhaust turbocharger 6. At the same time, by means of the damping volumes 21, 23, 25, 27, a development of noise that can optionally accompany the pressure impulses can be prevented from radiating through the fresh-gas system 3 or through the exhaust gas system 4 into the periphery of the internal combustion engine system 1.

In the embodiment shown in FIG. 3, at least one additional component 29 is additionally arranged in the exhaust gas system 4, which component can generally also be present in the embodiments in FIGS. 1 and 2. This component 29 can be, for example, a particulate filter, an oxidation catalytic converter, an NOx storage catalytic converter, an AdBlue system or any combination whatsoever of the named components. Of particular interest is, however, an embodiment in which a particulate filter is arranged in the exhaust gas system 4 upstream from removal point 11. This arrangement makes it possible for the recirculated exhaust gas to be comparatively clean, which leads to reducing the possibility of contaminating the fresh-gas system 3 downstream from the introduction point 12 through contact with recirculated exhaust gas.

In the embodiment shown in FIG. 1, the removal point 11 is arranged upstream from the turbine 7 in the exhaust gas system 4, and the introduction point 12 is arranged downstream from the compressor 8 in the fresh-gas system 3. In this embodiment, exhaust gas recirculation thus takes place on the exhaust-gas end and on the fresh-gas end, respectively in the high-pressure area. The system concerned in this instance would then be a high-pressure exhaust gas recirculation system. This embodiment has the advantage that the risk of dirtying the compressor 8 with the recirculated exhaust gas is considerably reduced.

In the embodiment shown in FIG. 2, the removal point 11 is arranged downstream from the turbine 7 in the exhaust gas system 4, and the introduction point 12 is arranged in the fresh-gas system 3 downstream from the compressor 8. In this embodiment, the removal point 11 is thus situated in the low-pressure area, while the introduction point 12 is arranged in the high-pressure area. The system concerned in this instance would then be a low-pressure/high-pressure exhaust gas recirculation system. The arrangement of the removal point 11 downstream from the turbine 7 causes the recirculated exhaust gas to have a reduced temperature. Because of this, it is particularly possible to design the exhaust gas valve 14 more economically since it then requires only reduced temperature resistance.

In the light of the embodiment shown in FIG. 2, it should be noted that by means of the exhaust gas valve 14, it is in principle possible to recirculate exhaust gas from the low-pressure side of the exhaust gas system 4 to the high-pressure side of the fresh-gas system 3. This is made possible particularly by the exhaust gas recirculation by means of pressure impulses that can be realised by means of the exhaust gas valve 14.

In the embodiment shown in FIG. 3, the removal point 11 is arranged downstream from the turbine 7 in the exhaust gas system 4, and the introduction point 12 is arranged in the fresh-gas system upstream from the compressor 8. Thus in this embodiment, both the removal point 11 as well as the introduction point 12 are situated in the low-pressure area. Accordingly, this system is a low-pressure exhaust gas recirculation system. In this embodiment, exhaust gas recirculation is simplified in comparison to the embodiment shown in FIG. 2 since a considerably reduced pressure is present upstream from the compressor 8.

The invention claimed is:

1. An internal combustion engine system, comprising:
   an internal combustion engine having a fresh-gas system for supplying fresh gas to the internal combustion engine,
   an exhaust-gas system for removing exhaust gas from the internal combustion engine,
   an exhaust gas recirculation system for removing exhaust gas from the exhaust gas system at a removal point and for introducing the removed exhaust gas into the fresh-gas system at an introduction point,
   a controller; and
   wherein the exhaust-gas system has an exhaust gas valve included with the exhaust gas system and located downstream from the removal point to control a cross-section of the exhaust gas system, which is selectively flowed through;
   wherein to realise a predetermined exhaust gas recirculation rate, the exhaust gas valve is at least one of designed and is controllable with a predetermined frequency in the exhaust gas recirculation system so as to generate impulse-like pressure impulses;
   wherein the exhaust gas valve is a fast-switching valve;
   wherein at least one of the following is selected:
   i. in the exhaust gas system, a damping volume is arranged upstream from the removal point; and
   ii. in the fresh-gas system, a damping volume is arranged downstream from the introduction point;
   wherein the exhaust gas valve is a continuously operating valve and wherein the controller is configured to operate the exhaust gas valve to rotate constantly in one direction of rotation as a function of at least one of an engine speed and an engine load of the internal combustion engine.

2. The internal combustion engine system as specified in claim 1, wherein the removal point is arranged upstream from a turbine of an exhaust turbocharger arranged in the exhaust gas system, and the introduction point is arranged downstream from a compressor of the exhaust turbocharger arranged in the fresh-gas system.

3. The internal combustion engine system as specified in claim 1, wherein the removal point is arranged downstream from a turbine of an exhaust turbocharger arranged in the exhaust gas system, and the introduction point is arranged downstream from a compressor of the exhaust turbocharger arranged in the fresh-gas system.

4. The internal combustion engine system as specified in claim 1, wherein the removal point is arranged downstream from a turbine of an exhaust turbocharger arranged in the exhaust gas system, and the introduction point is arranged upstream from a compressor of the exhaust turbocharger arranged in the fresh-gas system.

5. The internal combustion engine system as specified in claim 1, wherein the introduction point is arranged upstream from a fresh-gas cooler arranged in the fresh-gas system.

6. The internal combustion engine system as specified in claim 1, wherein a recirculation valve for controlling a cross-section of the exhaust gas recirculation system, which is selectively flowed through, is arranged in the exhaust gas recirculation system upstream from the introduction point.

7. The internal combustion engine system as specified in claim 1, wherein a fresh-gas valve for controlling a cross-section of the fresh gas system, which flowed through, is arranged in the fresh-gas system upstream from the introduction point.

8. The internal combustion engine system as specified in claim 1, wherein the predetermined frequency of controlling the exhaust gas valve is synchronized with a pressure fluctuation of the exhaust gas associated with a charge-change process in the exhaust gas system.

\* \* \* \* \*